United States Patent
Chun (10) Patent No.: US 6,480,909 B1
(45) Date of Patent: Nov. 12, 2002

(54) COMPUTER SYSTEM FOR SELECTIVELY CONNECTING IEEE 1394 INTERNAL PERIPHERAL DEVICES TO EITHER 1394 PHYSICAL LAYER PORTS OR 1394 EXTERNAL PORTS IN RESPONSE TO CONTROL SIGNAL

(75) Inventor: Jong-tae Chun, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/352,331

(22) Filed: Jul. 13, 1999

(30) Foreign Application Priority Data

Jul. 15, 1998 (KR) .............................. 98-28655

(51) Int. Cl.[7] .............................. G06F 3/00; G06F 13/00
(52) U.S. Cl. .............................. 710/38; 710/14; 710/37; 710/107; 710/131; 713/300
(58) Field of Search ................... 710/37, 38, 107, 710/131, 14; 713/300

(56) References Cited

U.S. PATENT DOCUMENTS

| | | | |
|---|---|---|---|
| 5,647,484 A | 7/1997 | Fleming | 206/576 |
| 5,748,443 A | 5/1998 | Flint et al. | 361/686 |
| 5,768,600 A | 6/1998 | Williams | 713/300 |
| 5,799,207 A | 8/1998 | Wang et al. | 710/38 |
| 6,061,746 A * | 5/2000 | Stanley et al. | 710/10 |
| 6,298,406 B1 * | 10/2001 | Smyers | 710/129 |
| 6,336,155 B1 * | 1/2002 | Ito et al. | 710/37 |
| 6,347,089 B1 * | 2/2002 | Tsui et al. | 370/425 |
| 6,356,968 B1 * | 3/2002 | Kishon | 710/129 |

FOREIGN PATENT DOCUMENTS

| | | |
|---|---|---|
| JP | 09-282263 | 10/1997 |
| JP | 10-116242 | 5/1998 |

* cited by examiner

Primary Examiner—Jeffrey Gaffin
Assistant Examiner—Tammara Peyton
(74) Attorney, Agent, or Firm—Robert E. Bushnell, Esq.

(57) ABSTRACT

An apparatus and a method for connecting peripheral devices to each other in a computer supporting IEEE1394 are provided. An apparatus for connecting peripheral devices in a computer supporting IEEE1394 according to the present invention for connecting internal 1394 peripheral devices connected to 1394 physical layer ports in the computer supporting the IEEE1394 includes a controller for generating a control signal for selecting either the computer or the 1394 peripheral device using apparatus, external 1394 ports connected to 1394 connectors of the 1394 peripheral device using apparatus, and a switching unit for selectively connecting the internal 1394 peripheral devices to either the 1394 physical layer ports or the external 1394 ports in response to the control signal.

15 Claims, 6 Drawing Sheets

COMPUTER SYSTEM FOR SELECTIVELY CONNECTING IEEE 1394 INTERNAL PERIPHERAL DEVICES TO EITHER 1394 PHYSICAL LAYER PORTS OR 1394 EXTERNAL PORTS IN RESPONSE TO CONTROL SIGNAL

CLAIM OF PRIORITY

This application makes reference to, incorporates the same herein, and claims all benefits accruing under 35 U.S.C. §119 and §120 from an application for *Apparatus and Method for Connecting Peripheral Devices in Computer Supporting IEEE* 1394 earlier filed in the Korean Industrial Property Office on Jul. 15, 1998 and there duly assigned Serial No. 28655/1998.

FIELD OF THE INVENTION

The present invention relates to connecting peripheral devices to a computer, and more particularly, to an apparatus and a method for connecting peripheral devices in a computer for supporting IEEE1394.

DESCRIPTION OF THE RELATED ART

Computers often have peripheral devices connected to them. For example, an HDD, a CD-ROM, a DVD-ROM, or a DVD-RAM are some of the possible peripherals that can be connected to a computer. Peripherals can either be connected external to the housing of a computer or connected internally within the housing of a computer. The drawback of having peripherals connected internally to a computer is that these peripherals cannot ordinarily be accessed by other computers without extensive effort.

What is needed is a computer that allows peripherals located within the main chassis to be accessed by another computer. This can occur in one of two ways. First, the power may be off to the first computer containing the peripherals when the peripherals are accessed by the second computer or second, the power to the first computer may be on when the peripherals internal to the first computer are accessed by the second computer.

SUMMARY OF THE INVENTION

To solve the above problem, it is an object of the present invention to provide an apparatus for connecting peripheral devices in a computer supporting IEEE1394 by which it is possible to easily use internal peripheral devices of a main computer in an external computer by simply and directly connecting internal peripheral devices installed inside the main computer to the external computer, using a switch.

It is another object of the present invention to provide a method of connecting peripheral devices in a computer for supporting the IEEE1394 performed by the above apparatus.

Accordingly, to achieve the first object, there is provided an apparatus for connecting peripheral devices in a computer supporting IEEE1394 in which internal 1394 peripheral devices connected to 1394 physical layer ports are connected to a 1394 peripheral device using apparatus outside the computer, comprising a controlling portion for generating a control signal for selecting either the computer or the 1394 peripheral device using apparatus, external 1394 ports connected to 1394 connectors of the 1394 peripheral device using apparatus, and a switching portion for selectively connecting the internal 1394 peripheral devices to either the 1394 physical layer ports or the external 1394 ports in response to the control signal.

To achieve the second object, there is provided a method for connecting peripheral devices in a computer supporting IEEE1394 in which internal 1394 peripheral devices connected to 1394 physical layer ports are connected to the 1394 peripheral device using apparatus outside the computer, comprising the steps of (a) inputting the selection of a user with respect to a predetermined internal 1394 peripheral device after the computer is turned on, (b) intercepting the internal 1394 peripheral devices from the 1394 physical layer ports and connecting the internal 1394 peripheral devices to the external 1394 port connected to the 1394 connector of the 1394 peripheral device using apparatus when the 1394 peripheral device using apparatus is selected, and (c) intercepting the internal 1394 peripheral devices from the external 1394 ports and connecting the internal 1394 peripheral devices to the 1394 physical layer ports when the computer is selected.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
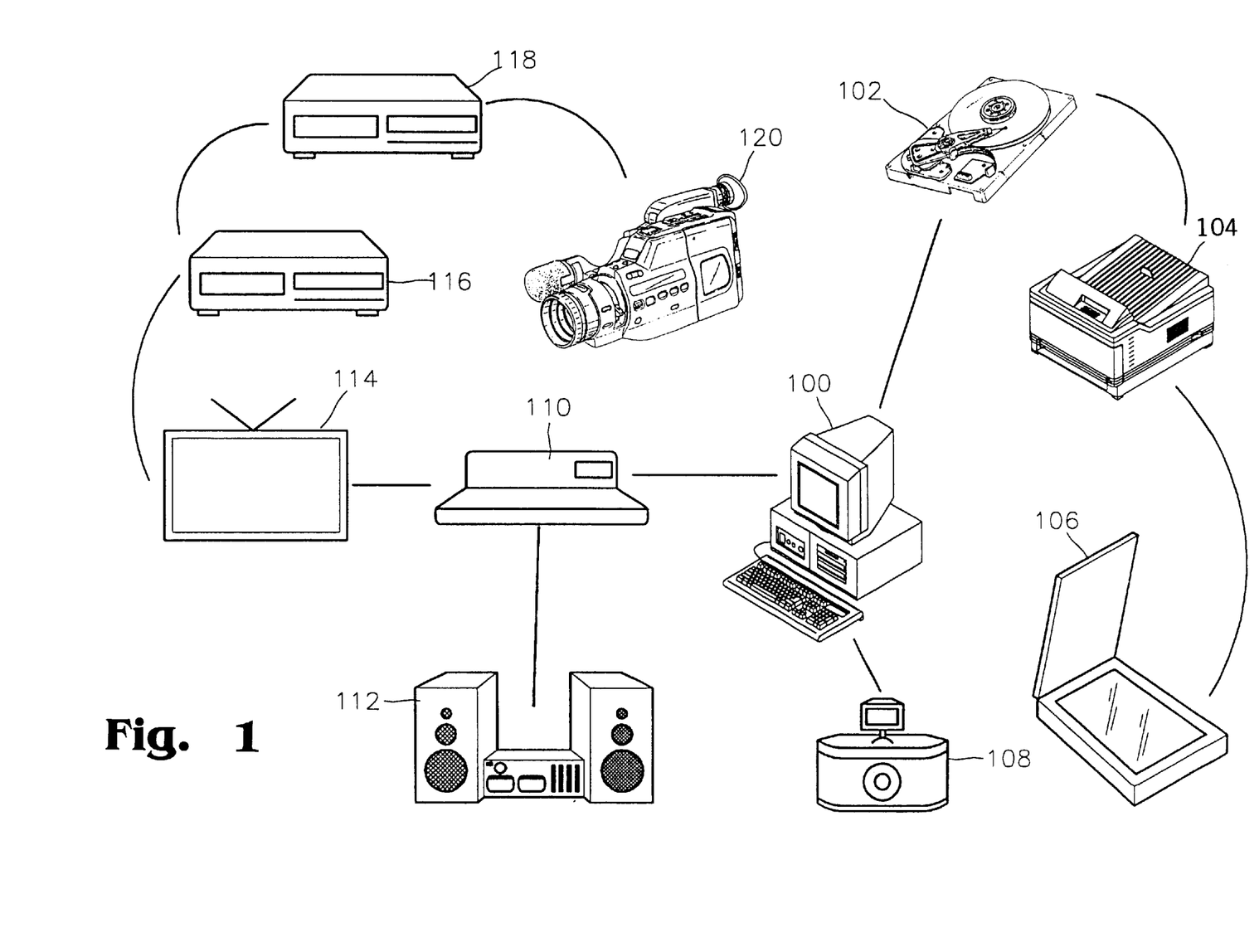
FIG. 1 schematically shows a network using an IEEE1394 bus.

FIG. 1 schematically shows a network in which an IEEE1394 bus is used. A computer 100, an HDD 102, a printer 104, a scanner 106, a digital camera 108, a set top box 110, an audio set 112, an HDTV 114, a DVCR 116, and a DVDP 118 are connected to each other through the IEEE1394 bus.

Here, the devices connected through the IEEE1394 bus must have an IEEE1394 protocol stack. Also, a device including a display apparatus such as the computer 100 and the HDTV 114 is used as a controlling device. A plurality of controlled devices connected to the controlling device are comprised of object devices. Accordingly, control between devices is performed.

Figure 2:
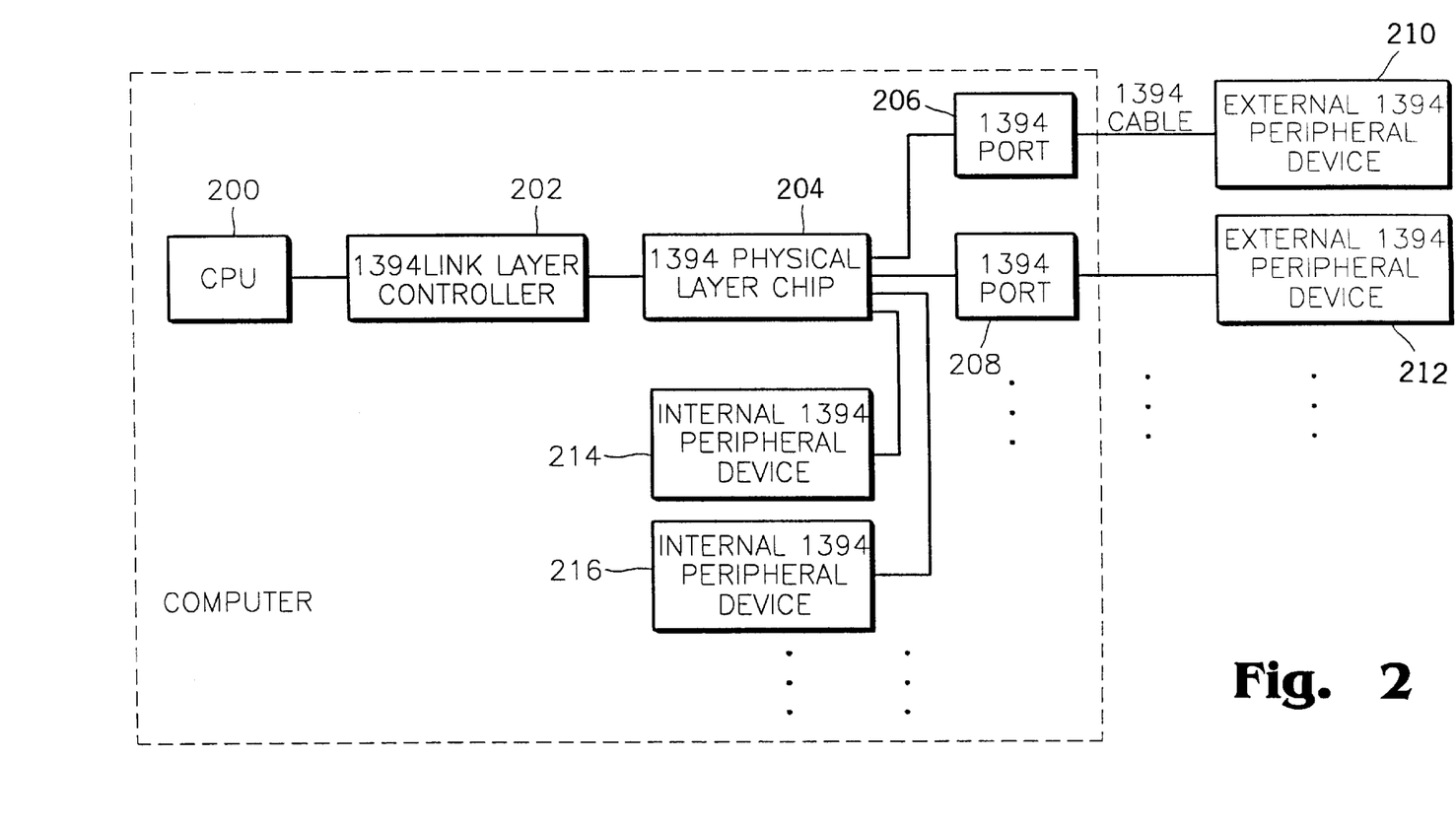
FIG. 2 schematically shows a general connection state of 1394 peripheral devices in a computer supporting IEEE1394.

FIG. 2 schematically shows a general connection state of a 1394 peripheral device in a computer supporting IEEE1394.

According to an IEEE1394 protocol stack, a 1394 link layer controller 202 and a 1394 physical layer chip 204 are connected to a CPU 200 of the computer supporting the IEEE1394. There are two methods of connecting a 1394 cable to the 1394 physical layer chip 204 which is a least significant layer. One is to connect other devices supporting 1394 such as external 1394 peripheral devices 210, 212, . . . installed outside the computer to 1394 ports 206, 208, . . . by the 1394 cable, using a plurality of 1394 ports 206, 208, . . . connected to the 1394 physical layer chip 204 as an external jack of the computer. The other is to directly connect internal 1394 peripheral devices 214, 216, . . . installed inside the computer to the port of the 1394 physical layer chip 204 by the 1394 cable. Such 1394 peripheral devices are automatically sensed by the computer when they are connected to the 1394 physical layer chip 204 and operate with software in the computer.

The external 1394 peripheral devices 210, 212, . . . installed outside the computer are easily connected to other computers. However, when the internal 1394 peripheral devices 214, 216, . . . installed inside the computer are to be directly connected to other computers, it is not easy to use the internal 1394 peripheral devices since the internal 1394 peripheral devices are to be installed in the external computer after opening the case of the main frame of the computer and disassembling the peripheral devices.

Also, in order to indirectly use the internal 1394 peripheral devices in other computers, the internal 1394 peripheral devices can be indirectly used as the remote peripheral equipments through a network service by installing additional network protocols in both sides of computers. However, in this case, the following problems are caused. First, the external computer cannot use the internal 1394 peripheral devices when the main computer in which the internal 1394 peripheral devices are installed is turned off. Second, the external computer cannot use functions such as an automatic setup of a CD-ROM and an OS of a memory. Third, speed of transferring data to the external computer is lowered. Fourth, a new user cannot easily install software for a network service.

Figure 3:
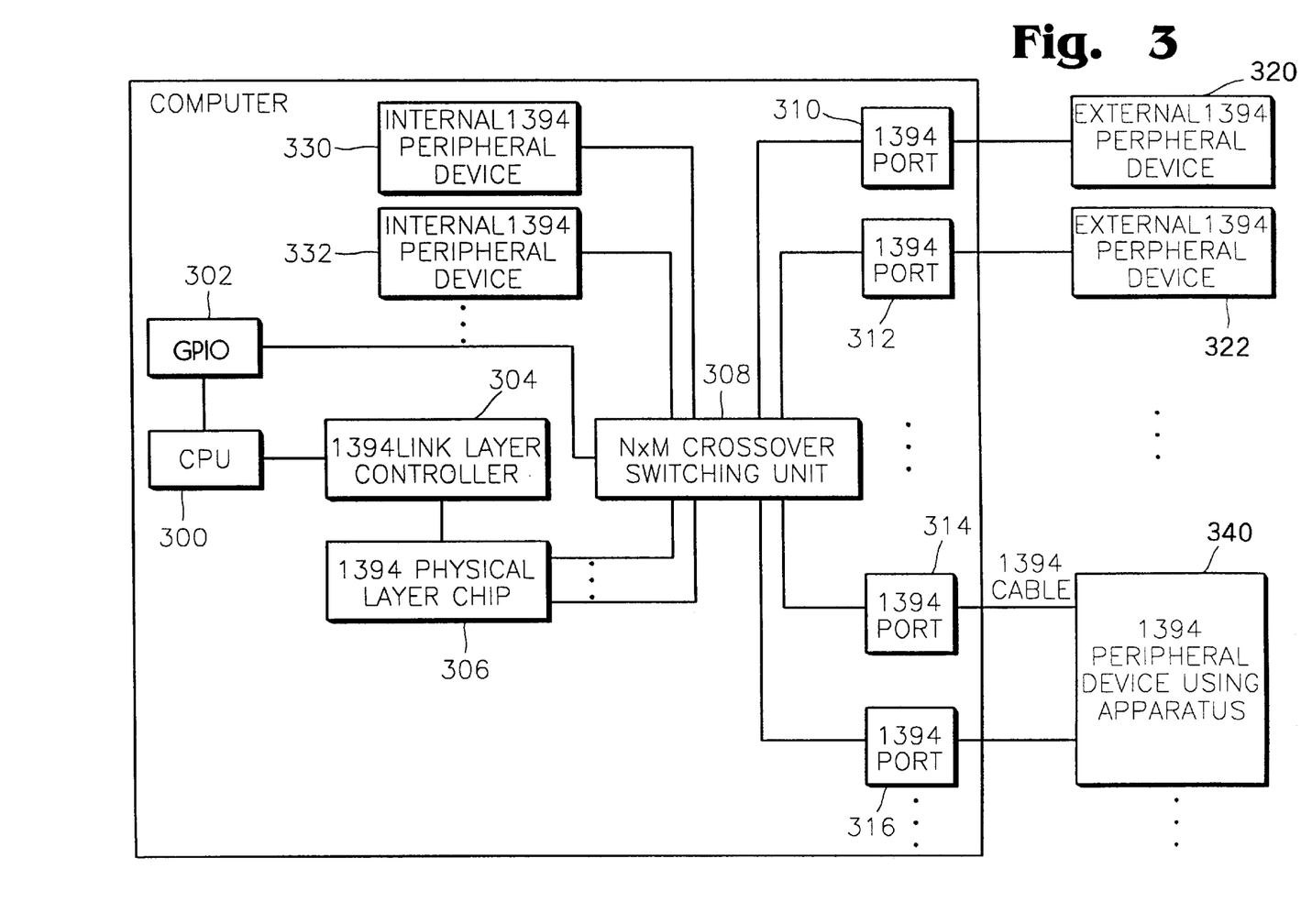
FIG. 3 is a block diagram showing an apparatus for connecting peripheral devices according to the present invention in the computer supporting the IEEE1394.

FIG. 3 is a block diagram showing an apparatus for connecting peripheral devices according to a first embodiment of the present invention in a computer supporting the IEEE1394. The apparatus includes a central processing unit 300, a general purpose input output (GPIO) 302, a 1394 link layer controller 304, a 1394 physical layer chip 306, an N×M crossover switching unit 308, and a plurality of 1394 ports 310, 312, 314, 316. The 1394 link layer controller 304 and the 1394 physical layer chip (PHY chip) 306 are connected to the CPU 300 of the computer supporting the IEEE1394 according to an IEEE1394 protocol stack.

Namely, the 1394 link layer controller 304 and the 1394 physical layer chip 306 can be called a 1394 host controller since they are installed in a computer in order to support the IEEE1394. A real 1394 cable is connected to the 1394 physical layer chip 306 which is the least significant layer. The 1394 cable connects other 1394 devices to the CPU 300 of the computer.

In the present invention, the 1394 physical layer chip 306 is connected to the N×M crossover switching unit 308. The switching unit 308 is connected to a plurality of 1394 ports 310, 312, 314, 316, . . . and internal 1394 peripheral devices 330, 332, . . . . To be specific, the N×M crossover switching unit 308 is connected to the external 1394 peripheral devices 320, 322, . . . installed outside the computer, such as a printer and a scanner through a plurality of 1394 ports 310, 312, . . . used as the external jacks of the computer by the 1394 cable.

Also, the N×M crossover switching unit can connect to other devices 340 such as an external computer to the internal 1394 peripheral devices 330, 332, . . . installed inside the computer, for example, other computers by the 1394 cable via 1394 ports 314, 316 . . . .

The ports of the N×M crossover switching unit 308 is comprised of N peripheral devices, i.e., a resource side connected to the internal 1394 peripheral devices 330, 332, . . . in FIG. 3 and M host ports, i.e., a user side connected to the 1394 ports 310, 312, 314, 316, . . . and the 1394 physical layer port. The N ports of the resource side are called resource ports and the M ports of the user side are called user ports. Also, the N×M crossover switching unit 308 includes an inputting unit for inputting a control signal.

Referring to FIG. 3, the CPU 300 generates a control signal for selecting a main computer or a 1394 peripheral device using apparatus 340, i.e., another computer so that the internal 1394 peripheral devices 330, 332, . . . installed inside the main computer can be used by computer 340 on the outside according to the need of a user. The control signal is transmitted to the N×M crossover switching unit 308 through the GPIO 302.

N×M crossover switching unit 308 selectively connects the internal 1394 peripheral devices 330, 332, to either the 1394 physical layer ports or the external 1394 ports in response to the control signal. Here, the external 1394 ports are connected to 1394 connectors of other computers.

A case in which the CPU 300 generates a control signal according to the need of the user can be programmed by a predetermined application program. When a computer including the internal 1394 peripheral devices is turned off, a control signal for selecting the 1394 peripheral device using apparatus 340 is generated. Accordingly, the N×M crossover switching unit 308 is automatically connected to the external 1394 jack of another computer to be connected to the internal 1394 peripheral devices by default.

When the computer including the internal 1394 peripheral devices is turned on, a control signal for selecting a main computer is generated after sensing the connection state of the internal 1394 peripheral devices using a predetermined supervising apparatus. At this time, when the internal 1394 peripheral devices are connected to another computer, the control signal for automatically selecting the main computer can be generated. Also, when the internal 1394 peripheral devices are used in another computer, the CPU 300 can be programmed so that a user determines whether the internal 1394 peripheral devices are to be connected to the main computer by letting the user confirm that the internal 1394 peripheral devices are used in another computer. Namely, information on the internal 1394 peripheral devices, i.e., information on connection of a plurality of computers to the internal 1394 peripheral devices is displayed on a screen by an application program. Accordingly, a user can determine whether the internal 1394 peripheral devices can be connected to the computer to be currently used.

Figure 4:
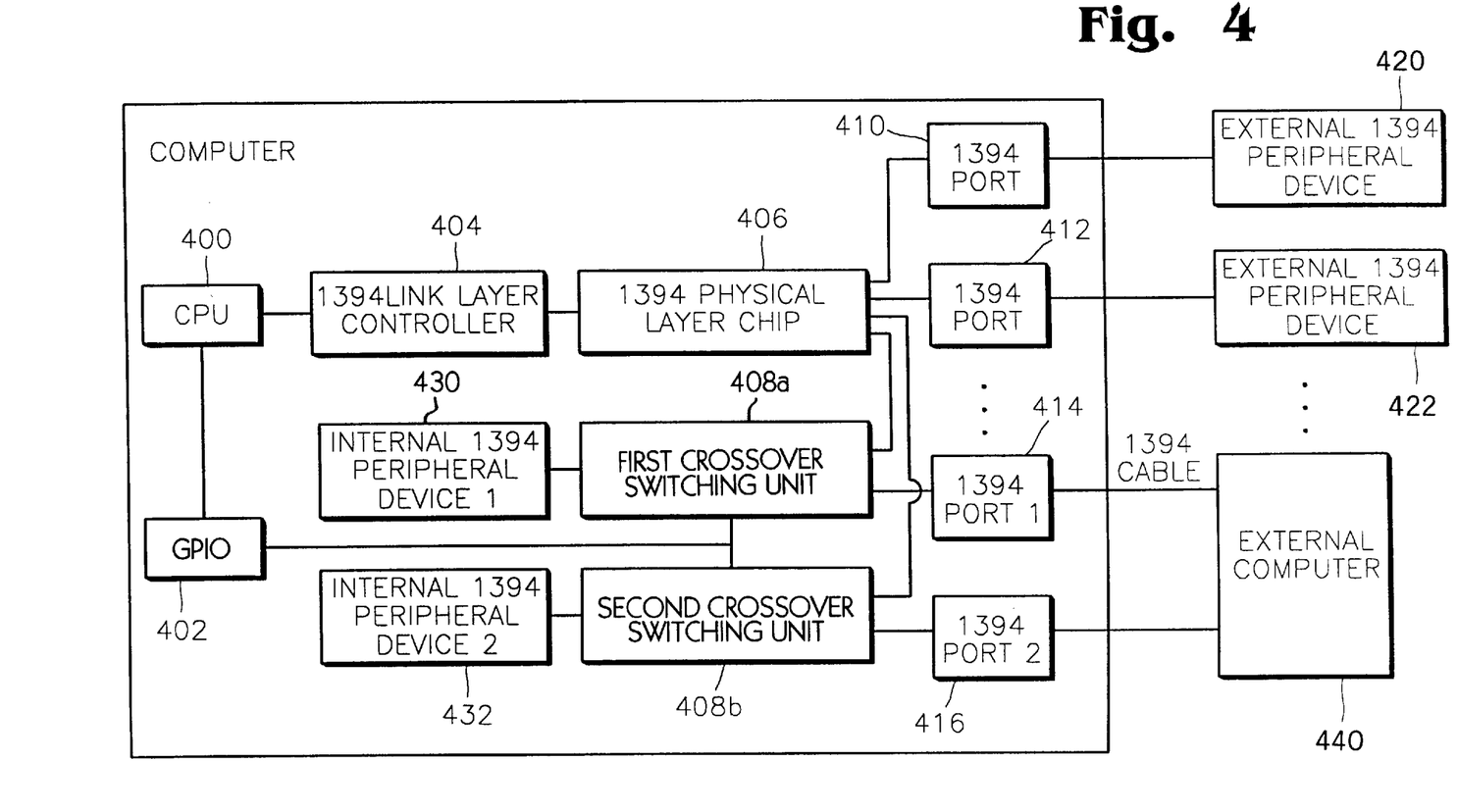
FIG. 4 is a block diagram showing an apparatus for connecting peripheral devices according to the present invention constructed using a 2×1 crossover switch.

FIG. 4 is a block diagram showing a peripheral device connecting apparatus according to a second embodiment of the present invention constructed using a 2×1 crossover switch as an example. The peripheral device connecting apparatus includes a central processing unit 400, a general purpose input and output (GPIO) 402, a 1394 link layer controller 404, a 1394 physical layer chip 406, first and second crossover switches 408a and 408b, and a plurality of 1394 ports 410, 412, 414, 416, . . . .

Referring to FIG. 4, the 2×1 crossover switch is used as an example of the M×N crossover switch. One internal 1394 peripheral device is connected to either an internal 1394 physical layer chip or a 1394 port connected to the outside through one 2×1 crossover switch. Namely, an internal 1394 peripheral device 1 430 and an internal 1394 peripheral device 2 432 are respectively connected to either the internal 1394 physical layer chip 406 or the 1394 port 1 414 and the 1394 port 2 416 connected to the outside through the first and second crossover switches 408a and 408b.

For example, an HDD, a CD-ROM, a DVD-ROM, or a DVD-RAM can be one internal 1394 peripheral device in a resource side. The respective control signals of the plurality of 2×1 crossover switches can be controlled by the software of a computer.

Figure 5:
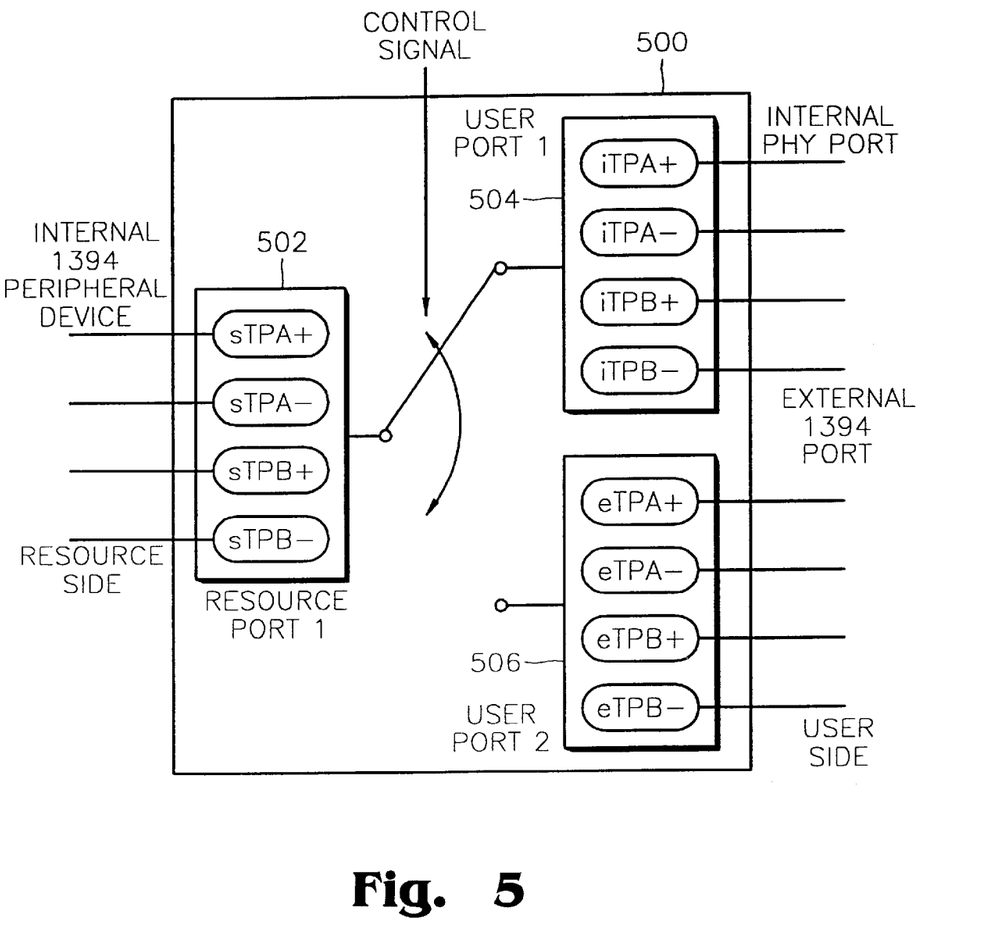
FIG. 5 shows the 2×1 crossover switch shown in FIG. 4 in detail.

FIG. 5 shows the 2×1 crossover switch shown in FIG. 4 in detail.

Referring to FIG. 5, the port of a 2×1 crossover switch 500 is comprised of a resource side connected to one internal 1394 peripheral device and a user side connected to one 1394 port and one 1394 physical layer port. The port of the resource side is called a resource port 1 502. The port of the user side is called a user port 1 504 and a user port 2 506.

Figure 6:
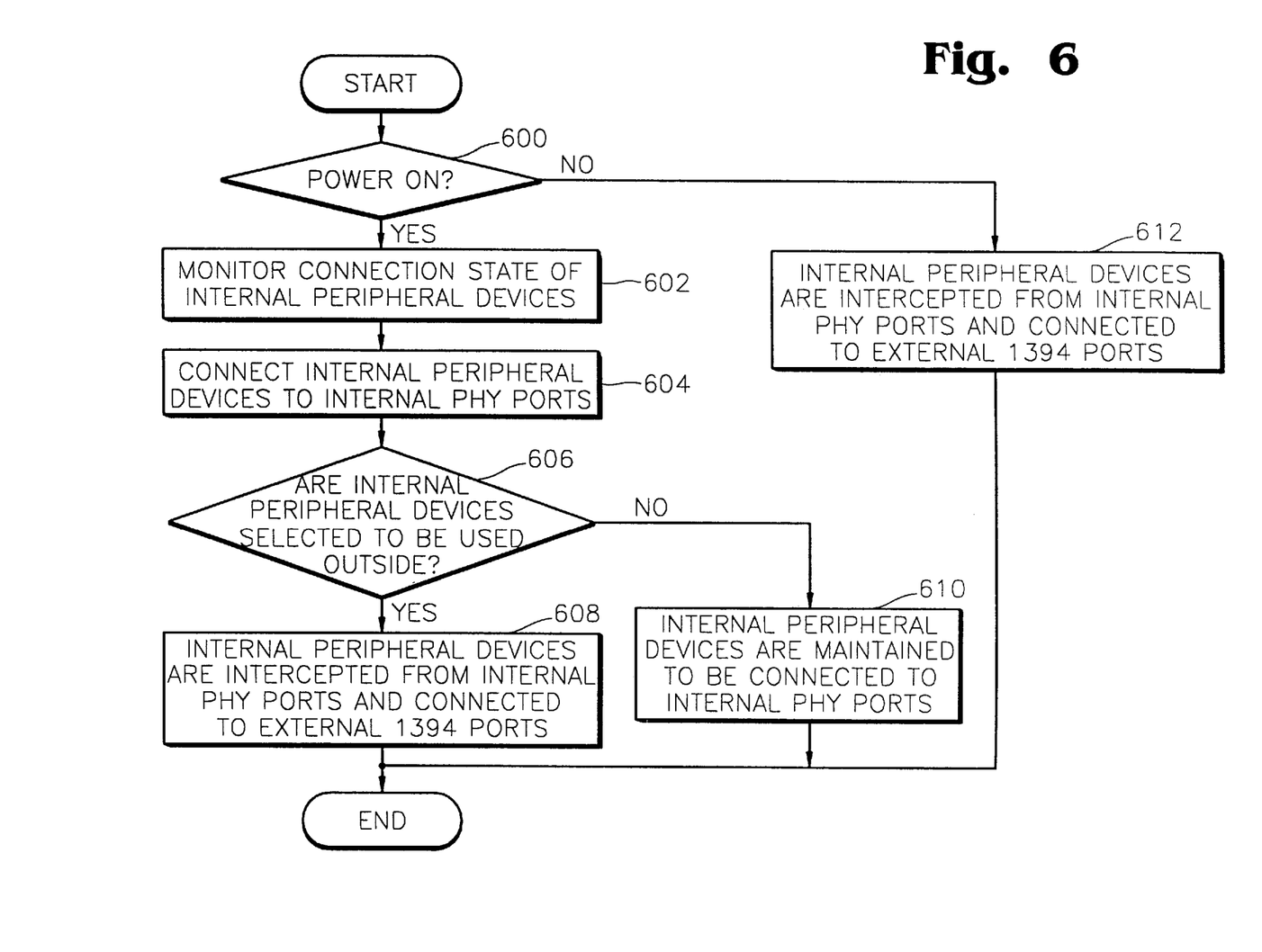
FIG. 6 is a flowchart for describing a method of connecting peripheral devices according to the present invention in the computer supporting the IEEE1394.

FIG. 6 is a flowchart describing a method for connecting peripheral devices according to the present invention in a computer supporting IEEE1394.

First, it is determined whether the computer supporting the IEEE1394 is turned on (step 600). If the computer is turned on, it is monitored whether the internal 1394 peripheral devices are connected to the 1394 physical layer ports inside the computer (step 602). Here, the internal 1394 peripheral devices are installed inside the computer. However, the internal 1394 peripheral devices can be connected to the external 1394 ports through the N×M crossover switching unit so as to be used in the 1394 peripheral device using apparatus outside the computer, for example, another computer supporting the IEEE1394.

As a result of monitoring in the step 602, when the internal 1394 peripheral devices required after turning on the computer are connected to another computer, the internal 1394 peripheral devices are connected to the internal physical layer port of the main computer (step 604). Here, the internal physical layer port is the least significant port according to the IEEE1394 protocol stack which the computer supporting the IEEE1394 has.

After the step 604, the selection of a user with respect to the internal 1394 peripheral devices is input. It is determined whether a predetermined internal 1394 peripheral device is selected to be used outside (step 606). If the predetermined internal 1394 peripheral device is selected to be used outside, the internal 1394 peripheral device is intercepted from the 1394 physical layer port and is connected to the external 1394 port connected to the 1394 connector of the 1394 peripheral device using apparatus outside the computer (step 608). If the predetermined internal 1394 peripheral device is not selected to be used outside, a previous connection state of the internal 1394 peripheral device is maintained (step 610).

When it is determined that the computer is turned off in the step 600, the internal 1394 peripheral devices are intercepted from the internal physical layer ports and are connected to the external 1394 ports (step 612).

As mentioned above, according to an apparatus and a method for connecting peripheral devices in a computer supporting IEEE1394 according to the present invention, it is possible to use internal peripheral devices even when a main computer is turned off, to use functions such as an automatic set-up of a CD-ROM and an OS of a memory, and to use the data transmission of a 1394 full throughput by simply and directly connecting the internal peripheral devices installed inside the main computer to an external computer without undergoing complicated processes of opening the case of the main frame of the main computer and installing additional software.

What is claimed is:

1. An apparatus for connecting peripheral devices in a computer supporting IEEE1394 in which internal 1394 peripheral devices connected to 1394 physical layer ports are connected to a 1394 peripheral device using apparatus outside the computer, comprising:
   a controlling portion for generating a control signal for selecting either the computer or the 1394 peripheral device using apparatus;
   external 1394 ports connected to 1394 connectors of the 1394 peripheral device using apparatus; and
   a switching portion for selectively connecting the internal 1394 peripheral devices to either the 1394 physical layer ports or the external 1394 ports in response to the control signal.

2. The apparatus of claim 1, wherein the controlling portion generates a first control signal for selecting the 1394 peripheral device using apparatus when the computer is turned off and a second control signal for selecting the computer according to a result of sensing the connection state of the internal 1394 peripheral devices when the computer is turned on.

3. A method for connecting peripheral devices in a computer supporting IEEE1394 in which internal 1394 peripheral devices connected to 1394 physical layer ports are connected to a 1394 peripheral device using apparatus outside the computer, comprising the steps of:
   (a) inputting a selection of a user with respect to a predetermined internal 1394 peripheral device after the computer is turned on;
   (b) intercepting the internal 1394 peripheral devices from the 1394 physical layer ports and connecting the internal 1394 peripheral devices to a external 1394 port connected to the 1394 connector of the 1394 peripheral device using apparatus when the 1394 peripheral device using apparatus is selected; and
   (c) intercepting the internal 1394 peripheral devices from the external 1394 ports and connecting the internal 1394 peripheral devices to the 1394 physical layer ports when the computer is selected.

4. The method of claim 3, wherein the internal 1394 peripheral devices are intercepted from the 1394 physical layer ports and connected to the external 1394 ports when the computer is turned off.

5. An apparatus for accessing a plurality of peripheral devices internal to said first computer by a second computer, comprising:
   a plurality of external ports for allowing said plurality of internal peripheral devices to be accessed by said second computer;
   a physical layer port; and
   a central processing unit controlling whether said plurality of internal peripheral devices are connected to said physical layer port or said plurality of external ports, said second computer being located outside said first computer and capable of accessing said plurality of internal peripheral devices when said plurality of peripheral devices are connected to said internal plurality of external ports.

6. The apparatus of claim 5, further comprising a plurality of first crossover switching units, each crossover switching unit connected to one of said plurality of internal peripheral devices, said plurality of first crossover switching units receiving a signal from said central processing unit and connecting said plurality of internal peripheral devices to one of said plurality of external ports and said physical layer chip.

7. The apparatus of claim 6, wherein said first computer and said second computer support a IEEE 1394 bus.

8. The apparatus of claim 7, said second computer automatically accessing said plurality of internal peripheral devices when power to said first computer is turned off.

9. The apparatus of claim 7, said second computer accessing said plurality of internal peripheral devices when power to said first computer is turned on.

10. A method to access a plurality of peripheral devices internal to a first computer by a second computer, comprising the steps of:

determining whether power to said first computer is on;

accessing said plurality of peripheral devices internal to said first computer by said second computer if said first computer is powered down;

monitoring whether said plurality of peripheral devices internal to said first computer are electrically connected to a physical layer chip or an external port when said power to said first computer is turned on;

connecting said plurality of internal peripheral devices to a physical layer port when said first computer is electrically powered on;

determining whether said plurality of internal peripheral devices are to be accessed by said second computer if power to said first computer is turned on;

connecting said plurality of peripheral devices to external ports allowing said second computer only to access said plurality of internal peripheral devices if power to said first computer is turned on and it is determined that said plurality of internal peripheral devices are to be accessed by said second computer; and maintaining connection of said plurality of internal peripheral devices to said physical layer port if it is determined that said plurality internal of peripheral devices are not to be accessed by said second computer.

11. The method of claim 10, wherein said plurality of internal peripheral devices are connected either to said physical layer port or said external ports by a plurality of crossover switches operated by software commands from a controller of said first computer.

12. The apparatus of claim 1, said switching portion causing said peripheral devices inside said computer to be controlled by said controller of said computer or by a controller inside said 1394 peripheral device using apparatus disposed outside said computer depending on said control signal received from said controlling portion of said computer when said computer is powered on.

13. The apparatus of claim 1, said internal 1394 peripheral devices being controlled by said 1394 peripheral device using apparatus when said internal 1394 peripheral devices are connected to said external 1394 ports even when power to said computer is turned on.

14. The apparatus of claim 5, further comprising a switching unit switching selected ones of said plurality of internal peripheral devices from said physical layer chip to said second computer to be controlled by said second computer even when power to said first computer is turned on.

15. The method of claim 10, said plurality of internal peripheral devices being connected to either said physical port layer or said external ports by a switching unit.

* * * * *